3,209,022
ANAESTHETIC COMPOSITIONS
Etienne Cuingnet, Meschers, Charente Maritime, France, assignor to Societe Anonyme Laboratoires Corbiere et Pansements Brevets Corbiere, Paris, France, a corporation of France
Filed Aug. 2, 1961, Ser. No. 128,806
Claims priority, application France, Nov. 7, 1960, 843,158; 843,159
1 Claim. (Cl. 260—472)

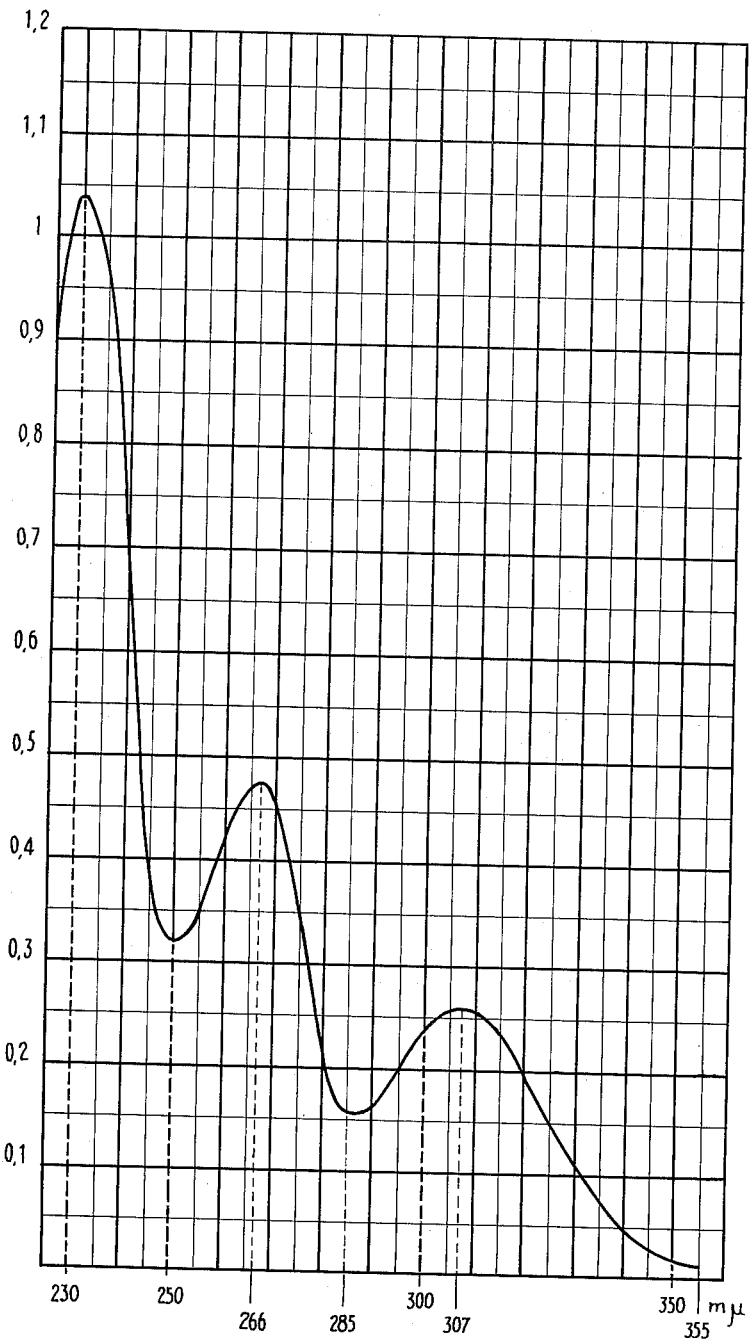

This invention relates to the novel synthetic compound 2'-diethylaminoethoxy-ethanol 3-amino 4-n-butoxy benzoate monohydrochloride, having the developed formula

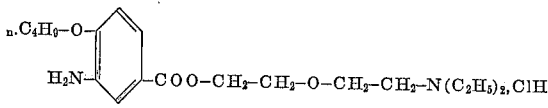

The compound has been found to possess powerful local anaesthetic activity.

The compound has a molecular weight of 388.5. It occurs as a white crystalline powder, of bitter flavour, soluble in water, absolute alcohol, acetone and 95° alcohol, insoluble in ether. Its melting point as measured by Maquenne's block method is 110° C. with decomposition.

It has a spectrophotometer absorption curve as shown on the accompanying chart which shows the absorption curve of a solution containing 20γ/ml. of the compound, and is seen to have a maximum at the 266 m$\mu$ wavelength.

The compound can be prepared from the methyl or or the ethyl ester and sometimes the butyl ester of 3-nitro 4-n.butoxy-benzoic acid. The methyl ester of 3-nitro 3-n.butoxybenzoic acid is obtained by reacting an n.butyl halide with methyl 4-hydroxybenzoate in the presence of anhydrous potassium carbonate in acetone or with the corresponding alkali phenate in a butanol medium. The ethyl and butyl esters can also be used in a similar conversion reaction. When dissolved in acetic anhydride, the methyl, butyl and ethyl 4-butoxy benzoates thus prepared are nitrated at the ortho position of the phenol ether function under the action of the nitro-acetic mixture.

According to the invention, the method of preparing the novel compound is characterized in that a chloride of 3-nitro 4-n.butoxy benzoic acid is prepared, and is then reacted in solution with an amino alcohol and the residual ester is treated with hydrochloric acid to obtain the 2-diethylamino ethanol 3 nitro-4 n.butoxy benzoate hydrochloride.

In one form of embodiment of this method, the methyl, ethyl or butyl ester of 3-nitro 4-n.butoxy-benzoic acid is saponified with a hydro-alcoholic sodium hydroxide solution, to obtain the aforesaid 3-nitro 4-n.butoxy benzoic acid. This is then reacted with thionyl chloride to convert it into the acid chloride. The acid chloride is dissolved in a non-hydroxylated solvent, e.g. ethyl acetate, and the resulting solution is reacted with 2-diethylaminoethoxy ethanol to provide the nitro-butoxy-benzoic ester of the amino alcohol; and this is reacted with hydrochloric acid to provide the hydrochloride of 2-diethylaminoethoxyethanol 3-nitro 4-n.butoxy benzoate. Finally the hydrochloride is subjected to catalytic reduction with palladium-carrying carbon.

In a modified procedure, the 3-nitro 4-n.butoxy benzoate of methyl or ethyl is heated with diethylaminoethoxy-ethanol in the presence of a metal alcoholate in a solvent such as toluene, the alcohol which thereupon forms is eliminated by distillation, and the residual basic ester is treated with hydrochloric acid. The resulting 2-diethylamino-ethoxyethanol 3-nitro 4-n.-butoxy-benzoate hydrochloride is then catalytically reduced with palladium carbon catalyst.

The catalytic reduction step may be carried out at atmospheric pressure at about 50–60° C., or under an increased hydrogen pressure, which latter increases the reaction rate.

The ensuing examples will first illustrate the preparation of the various intermediaries involved, and then the preparation of the final hydrochloride of the invention.

EXAMPLE I

Preparation of ethyl 4-n.butoxy-benzoate

In a 1 liter balloon flask a sodium butylate solution was prepared by gradually adding 23 g. (1 atomic equivalent) sodium to 500 ml. normal butanol 166 g. (1 mole) methyl p.hydroxybenzoate were then dissolved in this solution; on complete dissolution, 150.7 g. (1.1 mole) n.butyl bromide were added in a single batch. The mixture was heated under reflux for 3 hours in an electric flask-heater. The solution at the end of the heating step was neutral to a litmus reagent. The sodium bromide formed was drained away and the solvent was distilled off in a vacuum obtained with a water ejector. The oily residue was then washed with water, 160 ml. ether being added to promote separation. The ether solution was dried over 25 g. anhydrous sodium sulfate and, after evaporation of the solvent the ethyl n.butoxy-benzoate was purified by distillation in vacuo.

At a temperature of 175° C. and a pressure of 14 mm. Hg the ethyl 4-n.butoxy-benzoate condensed as a mobile, colorless liquid and was recovered. There was also recovered a low-boiling fraction at 192° C. below 14 mm. Hg. This fraction was found to comprise a small amount of butyl 4-n.butoxy-benzoate apparently formed by partial alcoholysis of the ethyl ester during the reaction. The yield in crude ester approached 90%.

EXAMPLE II

Preparation of butyl 4-n.butoxy benzoate

The preparation procedure is generally similar to that of Example I except that 194 g. (1 mole) butyl paraoxybenzoate and 150.7 g. (1.1 mole) butyl bromide were used as the starting ingredients. The product is a colourless liquid, boiling at 196–199° C. under 14 mm. Hg. Preparation yield 180 g.

EXAMPLE III

Preparation of methyl 4-n.butoxy-benzoate

A mixture comprising 152 g. (1 mole) methyl paraoxybenzoate, 140 g. pulverulent anhydrous potassium carbonate powder, 150 g. (1 mole) normal butyl bromide and 400 ml. anhydrous acetone were placed in a 2-liter balloon flask and heated at reflux for 36 hours in a steam bath. The mixture was stirred by hand to avoid the formation of too compact a solid mass. The solvent was then distilled off in a water bath and 600 ml. water were added to the solid residue. Then the organic phase overlying the alkali solution was decanted off and the alkaline solution was exhausted with ether (100 ml.). The ester and the ether solution were combined, washed with 200 ml. distilled water and dried over 30 g. anhydrous sodium sulfate, then the solvent was evaporated away in vacuo. The resulting methyl 4-n.butoxy-benzoate was purified by distillation under reduced pressure. The pure product is a clear liquid having rather high mobility. Boiling point is 166° C. under 14 mm. Hg. Yield 60–65%.

EXAMPLE IV

*Preparation of methyl 3-nitro 4-n.butoxy-benzoate*

125 g. methyl 4-n.butoxy-benzoate and 125 cc. 99% acetic anhydride were placed in a 700 ml. conical flask. The mixture was cooled to about 10° C. and an acetonitric solution obtained by mixing 38.5 ml. smoking nitric acid ($D=1.49$–$1.50$) and 65 ml. glacial nitric acid was gradually added with agitation. The nitration reaction commenced quite promptly. When the temperature rose to 15–17 ° C., the reaction vessel was placed in an ice bath and the addition of the nitrating mixture was continued at a controlled rate so as to hold the reaction temperature within the range 5–10° C. The mixture was agitated 3 hours during which the ice was allowed to melt. The solution then set bodily to the crystalline state. The temperature was raised to 50° C. for 30 minutes and the cool solution was poured over 300 g. crushed ice. There thereupon formed a pale yellow crystalline precipitate which was allowed to remain in contact with the ice with agitation until the ice melted completely. The precipitate was then drained off, washed over a water filter and dried in air. The crystals were dissolved in 300 ml. boiling cyclohexane, the residual traces of water were driven off by entrainment, and the solution was allowed to cool, with the crystallization being primed off at about 45° C. There were thus obtained 118 g. methyl 3-nitro 4-n.butoxy benzoate in the form of thin, bright yellow plates.

On recrystallizing the product twice from cyclohexane, its melting point was 68–69° C.

When the filtrate was partially evaporated a second fraction of nitrate ester was recovered in an amount of 10 g. The over-all yield was thus 128 g.

EXAMPLE V

*3-nitro 4n.butoxybenzoic acid*

In a 1-liter balloon flask provided with a mechanical stirrer, 200 g. crude ethyl 4-n.butoxy-benzoate and 200 ml. 99% acetic anhydride were placed. The mixture was cooled to about 10° C. and a nitroacetic solution obtained by carefully mixing 54.7 ml. smoking nitric acid (density 1.49–1.50) and 80 ml. glacial acetic acid, was added dropwise. The temperature of the reaction medium gradually rose to 15° C. The flask was then immersed in an ice-water mixture and the addition of the nitro-acetic solution was continued to keep the temperature below 10° C. When the addition was completed, agitation was continued at low temperature for an hour and the mixture was allowed to stand overnight at ambient temperature. It was then put into a water bath at about 50° C. for 30 minutes, then allowed to cool and poured over 500 g. of crushed, thawing ice. The mixture was stirred for about one hour, the denser organic phase was decanted off and the aqueous solution was extracted with two 75 ml. batches of benzene. The decanted oil and extracts were combined and washed successively with 100 ml. 10% sodium chloride solution and sodium carbonate solution of similar title. The mixture was dried by passing it over a column of anhydrous sodium sulfate, then the solvent was driven off in a water bath in a vacuum obtained with a water aspirator. The residual oil comprising crude ethyl 3-nitro 4-n.butoxy benzoate was then saponified.

For this saponification step an alkaline solution was prepared by mixing 200 g. 40% sodium hydroxide solution and 300 ml. methanol. This solution was poured into the nitrated ester placed in a 1 liter balloon flask, and the mixture was maintained in a boiling water bath for 1 hour. There rapidly formed an abundant orange-brown precipitate which was dissolved by adding water, and the methanol was then driven off at the temperature of the water bath with a slight vacuum. To the resulting solution 5 N hydrochloric acid was added at about 75° C. until the solution showed an acid reaction to the Congo red indicator. The nitro-butoxybenzoic acid precipitate was cooled and drained off, then washed over a cold water filter and dried in air. The crude acid product weighed 170 g. The yield was 84%.

Prior to the next steps of the synthesis the acid was subjected to purification by crystallization from a benzene-cyclohexane mixture, during which rather substantial losses were incurred. To effect the purification, 170 g. of the crude acid were dissolved in 500 ml. boiling benzene, and 5 g. of Norit Carbon (a discolouring black) were added to the solution. To the filtrate 100 ml. hot cyclohexane were added and the mixture on cooling released fine yellow crystals of pure 3-nitro 4-n.butoxybenzoic acid, melting at 168° C.

EXAMPLE VI

*Preparation of 2' diethylamino ethoxy-ethanol 3-amino 4-n. butoxy benzoate monohydrochloride*

In a 1-liter balloon flask provided with a reflux cooler 500 g. thionyl chloride, purified by distillation over one fifth of its weight of linseed oil, and 180 g. purified 3-nitro 4-n.butoxybenzoic acid, were placed. The reaction started at ordinary temperature and was allowed to become quiescent. The reaction mixture was then heated reflux for two hours. The excess thionyl chloride was distilled off in a water bath and the last traces thereof were driven off by means of 100 ml. anhydrous benzene in a vacuum obtained with a water aspirator. The residual oil comprised crude 3-nitro 4-n.butoxybenzoic acid chloride, and was used in this form in the synthesis. All of the above operations were carried out under a hood.

The acid chloride thus prepared was dissolved in 300 ml. pure ethyl acetate, and the solution was added gradually to a cooled mixture of 242 g. 2–2'-diethylamino ethoxyethanol and 250 ml. ethyl acetate, while maintaining the temperature of the mixture at about 25–30° C. through external cooling. The mixture was left to stand overnight at ordinary temperature, and was then poured into 500 ml. of a 2 N hydrochloric acid solution while avoiding excessive temperature elevation. The mixture was then agitated and the hydrochloric phase drained off. The acid solution was washed with 150 ml. of a 1/1 mixture of petroleum ether and sulfuric ether, then rendered alkaline by adding ammonia solution (sodium carbonate may also be used). The diethylaminothoxyethanol 3-nitro 4-n.butoxybenzoic ester separated as a thick, brownish oil. This oil was extracted with ethyl acetate-ether (a.a.), the extracts were washed with water and dried over anhydrous potassium carbonate. The solution was filtered in a draining filter comprising glass sinter covered with a 1.5 cm. layer of active carbon, under a slight vacuum. The solvent was driven off in a water bath under water-aspirator vacuum, and the oily residue was dissolved in 400 ml. of methanol. The resulting solution was neutralized by adding a solution of hydrochloric acid gas in methanol to it.

The methanol solution of the hydrochloride was then subjected to catalytic hydrogenation.

For this purpose, there was added to the solution 15 g. of carbon containing 10% palladium and the solution was hydrogenated under a pressure of 80 kg./cm.$^2$ hydrogen at a temperature of 50–60° C. In these conditions the fixation of the hydrogen was completed in less than two hours, whereas such fixation is possible, but occurs at a slow rate at ordinary temperature and atmospheric pressure. The catalyst was separated by filtering (or centrifuging) and the methanol was driven off in a vacuum at 50–60° C. The green residue was taken up with 250 ml. pure boiling ethyl acetate, 40 ml. anhydrous acetone were added to it, and it was cooled in a refrigerator to −5° C. after seeding at about 40° C. After standing overnight the crystals that formed were drained dry, washed over a filter with a minimum amount of anhydrous acetone preliminarily cooled in a brine-ice bath.

The mixture was dried in vacuo, and a product was obtained which melted at 114–115° C. On recrystallization from anhydrous acetone, there was obtained a white crystalline powder melting at 117° C.

EXAMPLE VII

*Preparation of 2'-diethylamino-ethoxyethanol-3-amino 4-n.butoxy benzoate monohydrochloride*

In a 1-liter balloon flask provided with a heat-lagged Vigreux column connected with a downflow cooler, 118 g. of methyl 3-nitro 4-n.butoxy benzoate, 200 g. anhydrous toluene and 5 g. dry sodium ethylate were introduced. The mixture was heated gently in an oil bath, then the heating was controlled so as to maintain a slow rate of distillation of the methanol formed. The solution took on a brown colour. The reaction was stopped after about 3 hours heating. It was allowed to cool and 300 ml. of a 2 N HCl solution were added. The mixture was filtered and the aqueous hydrochloric phase was decanted off. From the toluenic phase, 33 g. of the initial nitro ester was recovered. The acid solution was washed with 150 ml. of a 1/1 petroleum ether and sulfuric ether mixture, then alkalized by addition of ammonia solution (or sodium carbonate solution). The diethylaminoethoxyethanol 3-nitro 4-n. butoxybenzoic ester separated out as a thick brownish oil. This oil was extracted with ethyl acetate-ether (a.a.), and the extracts were washed with water and dried over anhydrous potassium carbonate. The solution was filtered on a draining device using glass sinter covered with a 1.5 cm. deep layer of activated carbon under slightly subatmospheric pressure. The solvent was driven off in a water bath in the vacuum of a water aspirator, and the oily residue was dissolved in 200 ml. methanol. The resulting solution was neutralized by addition of a solution of hydrochloric acid gas in methanol.

The methanol solution of hydrochloride was then subjected to catalytic hydrogenation under the same conditions as in Example VI. The over-all yield in 2'-diethyl-amino-ethoxyethanol 3-amino 4-n.butoxy benzoate monohydrochloride was 50 g.

Pharmacological and clinical tests to which the novel compound was subjected have shown it to constitute a potent local anaesthetic, painless on injection, active even at very low doses, and quasi-immediate as well as durable in its action. It is very well tolerated at the active doses even by aged and cachectic subjects. It possesses slight local vasoconstrictive activity.

As a surface anaesthetic (corneal anaesthesia) the compound has proved to be 27 times more active than cocaine hydrochloride and 60 times more active than lignocaine. As an infiltration anaesthetic (method of the intradermic button in the guinea-pig and by intradermic button in the guinea-pig and by intradermic injection in the forearm in man) the compound is from 40 to 50 times more active than procaine hydrochloride and 20 times more active than lignocaine. As a conduction anaesthetic (lombar plexus of the frog and sciatic nerve and eye-lid of the rabbit), the product is 20 to 40 times more active than procaine hydrochloride, 10 times more active than cocaine hydrochloride and 10 to 20 times more active than lignocaine.

Applied to human therapy, the novel product may be provided in ampules as an injectable solute (distilled water or physiological serum) at $0.1^0/_{00}$ concentration (10 and 20 ml. doses), $0.5^0/_{00}$ concentration (2 and 10 ml. doses), and $2^0/_{00}$ concentrations (1.2, 3 and 5 ml.), the concentrations and volumes indicated being merely exemplary.

The compound is successfully usable both for infiltration anaesthesia in odonto-stomatological surgery and for loco-regional anaesthesia of any type in general medicine and surgery, by intra-dermic, subcutaneous, deep, radicular, truncular, sympathico-lombar, stellar and/or intra-articular infiltration.

In odonto-stomatological surgery, the $2^0/_{00}$ solution (1 to 3 ml.) appears preferable, although other concentrations and other volumes may be used.

In assessing the pharmacological characteristics of the novel synthesis compound, it has appeared convenient to establish a comparison thereof with the known compound beta-diethylaminoethyl-3-amino-4-butoxybenzoate, HCl, hereinafter designated for brevity as MS4. In both the novel compound of the invention and MS4, the butoxy and amino radicals as well as the side chain are in similar positions; however the chain is longer in the compound of the invention and it includes in addition an ethoxy radical absent in MS4. The comparative tests have shown the following results:

I. TOXICITY (a) *Acute toxicity.*—Determination of the respective lethal doses in MS4 and the novel compound has shown the former to be more than 14 times more toxic than procaine hydrochloride, whereas the novel compound is only 8 times more toxic.

(b) *Intravenous toxicity.*—In the mouse, MS4 proves to be about 11 times more toxic intravenously than procaine, whereas the novel compound is only about 6 times more toxic.

II. LOCAL TOLERANCES (a) *Ocular tolerance.*—Test results performed on the rabbit's cornea show MS4 to cause a slight irritation at the useful concentrations whereas the compound of the invention is very well tolerated.

(b) *Tissual tolerance.*—In man, at the useful concentrations, MS4 induces slight erythema and slight oedema wheras the compound of the invention causes no pain whatever on injection nor does it cause belated irritation even at concentrations substantially higher than the therapeutic concentrations.

III. LOCAL ANAESTHETIC ACTIVITY (a) *Surface Anaesthesia.*—Local surface anaesthesia was determined on the cornea of the rabbit. It has been shown that MS4 is 1.59 times more active than cocaine, while the compound of the invention is 27 times more active than cocaine.

(b) *Infiltration anaesthesia.*—From tests performed both on human subjects and guinea-pigs intradermally, it has been demonstrated that MS4 is about 5 times more potent than procaine hydrochloride while the novel compound is from 40 to 50 times more potent than said hydrochloride.

(c) *Anaesthetic index.*—The activity indices with respect to procaine are as follows: MS4: 0.55, Novel compound: 5. The corresponding indices with respect to the cocaine are: MS4 1.352, Novel compound 13.5.

Although the following theory is not restrictive, it appears plausible that the oxygen bridge and the increase in chain length have profoundly modified the anaesthetic activity and have thus given rise to a novel compound much more potent and having a markedly higher therapeutic index. It may be added that MS4 has not received wide recognition by practitioners owing to its low anaesthetic index, and its toxicity both in regard to the heart and the respiratory system.

Some examples of clinical treatments involving the novel compound are given hereinafter:

CLINICAL EXAMPLES (a) *Vestibular abscess, region L4.*—Prior to extraction, antibiotic and insuline (one million units) were applied. Local anaesthesia was provided by injecting 2 ml. of a $2^0/_{00}$ solution of the novel compound. Anaesthesia was good in spite of the inflamed condition of the tissue.

(b) *Extraction of a number of pyorrhoeic teeth, R2 L3 and R1, L1, L2 and r212 and R3, R7, r4.*—Ordinary anaesthesia at $1^0/_{00}$ was applied. The drawing was painful, and the anaesthesia was completed by applying 2 ml. of 2°/00 concentration of the novel compound, which gave good results.

(c) *Dental focal infection, extraction of r7, r8, R2, L8.*—Truncular anaesthesia in the Spix spine was applied using 3 ml. of 2°/00 solution of the novel compound for r6, r7 and r8 and 1 ml. of the solution in the vestibule. For R2 and L8, a para-apical injection of 2 ml. (in each instance) of 2°/00 solution of the novel compound was applied, with good results.

(d) *Incision of a whitlow.*—4 ml. of the 2°/00 solution of the new compound were injected. Immediately after the infiltration was completed the incision was performed and was completely painless.

(e) *Removal of a foreign body from the left middle finger.*—Using the same procedure as in Example (d) the operation was performed immediately after infiltration, and was completely painless.

(f) *Bilateral hernia, recurrent.*—Bilateral cure with resection of the funiculus, bilateral grat with resection of the funiculus.

An infiltration of 14 ml. of a 1°/00 solution of the novel compound followed by infiltration of 6 ml. of a 2°/00, solution thereof were performed. The long operation was then carried out with full success from all standpoints.

(g) *Allergic synovitis.*—Infiltration in the sheaths of the flexors, in the right hand and wrist, with 5 ml. of a 1 o/oo solution of the novel compound, followed by hydrocortancyl.

No pain was felt during infiltration of the palm of the hand although usually this is particularly painful.

(h) *Gastrectomy.*—Cancer of the stomach in a 78 year old male patient, with failing heart. Following a dose of sparteine, 8 ml. of a 0.5°/00 solution of the new compound were infiltrated, and this was followed by 6 ml. of a 2°/00 solution and infiltration in fine of the superficial planes with 20 ml. of a 0.1°/00 solution.

The resulting anaesthesia was deep, durable, without general reactions or cardiac accidents despite the age and heart condition of the subject.

The above examples demonstrate that the novel compound of the invention provides prompt and highly effective anaesthesia suitable for minor surgery and visceral surgery, using very low doses. Injection is painless and insensibility is long-acting.

What is claimed is:

As a composition of matter the compound 2'-ethylaminoethoxyethanol 3-amino 4-n.butoxy benzoate monohydrochloride having the formula

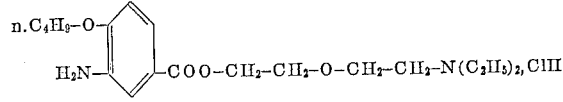

References Cited by the Examiner

UNITED STATES PATENTS

| | | | |
|---|---|---|---|
| 2,288,334 | 6/42 | Uliet et al. | 260—472 |
| 2,458,823 | 1/49 | Avakian | 260—472 |
| 2,717,905 | 9/55 | Ziegler | 260—472 |
| 2,818,369 | 12/57 | Luduena | 167—52 |
| 2,959,612 | 11/60 | Beaver | 260—472 |
| 3,000,783 | 9/61 | Marks | 167—52 |

OTHER REFERENCES

Freifelder et al.: J. Am. Chem. Soc., vol. 80 pages 4320–3 (1958).

Groggins: Unit Processes in Organic Synthesis (New York, 1952), pp. 519–20.

Horne et al.: Chem. Abstracts, vol. 28, page 213 (1934).

Levis et al.: Chem. Abstracts, vol, 50, pages 9595–6 (1956).

Richter: Textbook of Organic Chemistry, 1938 Edition, page 191, John Wiley and Sons, New York, N.Y.

Rubin et al.: J. Am. Chem. Soc., vol. 68, pages 623–4 (1946).

Wagner et al.: Synthetic Organic Chemistry (New York, 1953), pages 416–7, 486–7, and 654–7.

LEON ZITVER, *Primary Examiner.*

MORRIS O. WOLK, NICHOLAS S. RIZZO, DANIEL D. HORWITZ, *Examiners.*